Patented Nov. 24, 1953

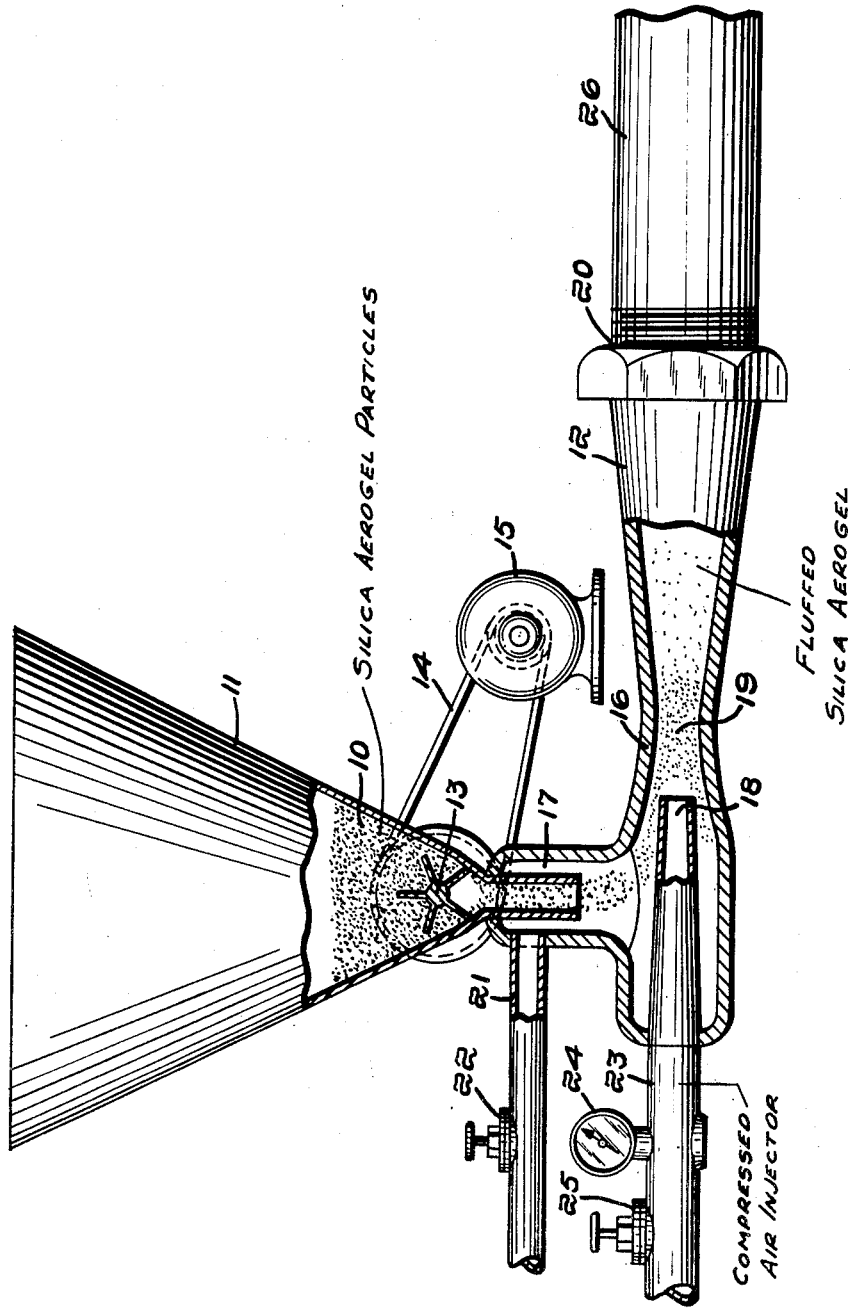
Nov. 24, 1953 — W. M. DAVIS — 2,660,564
METHOD OF REDUCING THE DENSITY OF AEROGELS AND SIMILAR MATERIALS
Filed Aug. 27, 1948

2,660,564

UNITED STATES PATENT OFFICE 2,660,564

METHOD OF REDUCING THE DENSITY OF AEROGELS AND SIMILAR MATERIALS

Walter M. Davis, Jamaica Plain, Mass., assignor to Monsanto Chemical Company, St. Louis, Mo., a corporation of Delaware Application August 27, 1948, Serial No. 46,504

5 Claims. (Cl. 252—62)

The present invention relates to a process of fluffing or reducing the apparent density of materials of the nature of aerogels such as inorganic oxide aerogels, carbon blacks, diatomaceous earth and the like. The present invention more particularly relates to a process of reducing the apparent density of silica aerogels.

Light silica aerogels having an apparent density below about 5.5 pounds per cubic foot are particularly valuable as insulating materials because they have a very low coefficient of thermal conductivity (or $k$) and a relatively low density. Thus, silica aerogels are employed in the manufacture of standard sized refrigerator cabinets of increased storage capacity by virtue of the fact that a relatively thin insulating wall is used in place of the standard insulating wall required for other types of insulating materials. Silica aerogels are also employed for other uses where insulating materials such as cork, glass wool and the like could not give the same insulating performance. Heavy silica aerogels having an apparent density above about 5.5 pounds per cubic foot are also efficient insulating materials, but because of their higher density larger masses of such aerogel must be used to do the same insulating job which is accomplished by light silica aerogels. However, heavy silica aerogels can be manufactured more economically than light silica aerogels since heavy aerogels are produced from more highly concentrated silica gels, or colloidal silica solutions, than can be employed in the manufacture of light silica aerogels using the same equipment and the same amount of labor. The larger mass of heavy silica aerogel is, therefore, produced at a lower cost.

It has now been found that when heavy silica aerogels are fluffed or reduced in density under certain conditions as will appear below, a material is obtained which is substantially comparable to light silica aerogels as an insulating material. Such material is manufactured at considerably less expense than light silica aerogels, on an equal weight basis and, therefore, is capable of being utilized for insulating purposes at a considerably reduced cost. The method described hereinafter is also applicable for reducing the apparent density of dense or heavy carbon blacks, diatomaceous earth, other aerogels and substantially similar materials.

It is one object of the present invention to provide a simple and efficient method for fluffing or reducing the apparent density of aerogels such as silica aerogels, carbon blacks, diatomaceous earth and other similar materials.

A further object of the invention is the preparation of an insulation grade of silica aerogel by a simple and efficient method.

A further object of the invention is the manufacture of low density silica aerogels having substantially the same insulating properties as light silica aerogels by reducing the apparent density of heavy silica aerogels.

Still further objects and advantages of the present invention will appear from the following description when taken in connection with the accompanying drawing and the appended claims.

For convenience in description, the invention will be described with reference to the fluffing of silica aerogels although it is to be understood that the method and principles described herein can also be applied to the fluffing of carbon blacks, diatomaceous earth, other aerogels and the like.

In accordance with the present invention a silica or inorganic oxide aerogel is fluffed, or its apparent density is reduced to a marked degree by feeding the aerogel, preferably in the form of nut-sized lumps or smaller particles, into a pipe provided with a constricted passageway or throat as found, for example, in air-jet ejectors, and simultaneously forcing the aerogel particles together with a gaseous substance, preferably air, which is drawn into the pipe at atmospheric pressure, through the constricted passageway or portion of the pipe by means of a high velocity or high pressure gaseous stream such as an air stream which has sufficient velocity to cause a substantial reduction in size of the silica aerogel particles by the attrition of one particle acting against another in the pipe. By operating in such a manner, the silica aerogel particles are not only reduced in size, but the final product after removal from the gas stream has an apparent density which is susbtantially lower than the density of the feed material. However, the basic cell or skeleton structure of the aerogel is not appreciably affected or changed by the method described herein.

By varying the rate of feed, the pressure or velocity of the air stream, the density of the feed aerogel and the size of the pipe and the constricted portion thereof as described hereinafter, the apparent density of the resulting product can be varied considerably as desired, depending upon the ultimate use of the fluffed aerogel.

Reference is now made to the accompanying drawing which illustrates, in partial section, a side view of one form of suitable apparatus for carrying out the present invention.

Silica aerogel particles 10 are fed from storage hopper 11 into air-jet ejector 12 by means of a rotary feeder such as a star valve 13. The rate of feed of the aerogel particles can be adjusted as desired by controlling the speed of rotation of the star valve. The star valve 13 is driven or rotated through a belt or chain 14 by means of electric motor 15 or by other suitable means. Air-jet ejector 12 is a conventional airjet ejector and consists of a casing 16 having a feed inlet 17, an air or gas nozzle 18, and a constricted passage or throat 19 between the air nozzle 18 and the exit opening 20. However, ejector 12 differs from conventional ejectors in that a pipe 21 is connected to the feed inlet or suction end of the ejector. When the ejector is in operation, air or other gaseous substances at atmospheric pressure are sucked into the ejector along with silica aerogel particles from the star valve. The quantity or volume of air or other gaseous substances which is sucked into the ejector in this manner is controlled as desired by means of a valve 22. Pipe 21 is preferably open to the atmosphere but may be connected to a suitable tank or receptacle containing such gaseous substances as nitrogen, carbon dioxide, hydrogen, helium and the like. By employing gaseous substances other than air, fluffed aerogels of varying thermal conductivity may be prepared.

As the silica aerogel particles and sucked-in air or other gaseous substances enter the ejector casing 16 they are forced through the constricted passage or throat 19 by means of a high velocity or high energy air or gas stream from nozzle 18. The high velocity air or gas stream is preferably generated by passing compressed air from pipe 23 through nozzle 18, but compressed gases other than compressed air may be employed if desired. The gauge pressure of the compressed air or gas in pipe 23 is measured or indicated by gauge 24, and the air flow is cut off when required by valve 25. The compressed air or gas is supplied to pipe 23 by a suitable air or gas compressor (not shown). The air or gas may be heated, if desired, at some stage prior to its passage through the nozzle. The gases described above or superheated steam may be employed instead of air.

When the silica aerogel particles are forced through the ejector in the manner described above, a substantial reduction in the particle size of the aerogel is effected, primarily due to the attrition between the particles. In addition, by forcing the silica aerogel through the constricted passage in the ejector together with the sucked-in air, a very marked fluffing of the silica aerogel is noted and the volume of the aerogel issuing from the ejector is markedly increased over the volume of the feed aerogel. However, the fluffing effect is not temporary since the aerogel does not substantially increase in density or decrease in volume after standing for relatively long periods of time.

The force or energy of the high velocity air stream in the ejector conveys the fluffed aerogel through pipe 26 which is screwed or otherwise fastened to the exit opening 20 of the ejector. Pipe 26 is of any appropriate length and is connected to a suitable separator or collector such as a bag filter (not shown), where the aerogel particles are separated from the air stream prior to packaging and shipping.

The size of the above apparatus can be varied considerably depending on the rate of production and the degree of fluffing or reduction in density desired, the air velocity or pressure employed and other variables. The diameter of the constricted portion or venturi of the pipe or ejector should be between about 1 and 6 inches to obtain the best results. The diameter of the exit opening of the pipe or ejector is generally between about ¾ and 2 inches larger than the diameter of the constricted portion of the pipe.

In carrying out the method described herein with an air-jet ejector having a constricted throat between about 1 and 6 inches in diameter, it has been found that a marked reduction in density of a silica aerogel is readily obtained when the gauge air pressure of the air in pipe 23 is about 50 to 125 pounds per square inch. However, gauge air pressures of from about 50 to 100 pounds per square inch are suitable when air-jet ejectors having a constricted throat between about 1 and 3 inches in diameter are employed. The rate of feed of the aerogel may be varied widely depending on the size of the ejector and the size of its venturi or constricted throat. In general, it is satisfactory to feed the material at a rate between about 50 to 200 pounds per hour. However, it is possible particularly with the larger size ejectors to use higher rates of feed, with the exception that the rate of feed should not be so high as to interfere with the fluffing action. Lower rates of feed may also be employed, but in such case efficiency of the process is lowered.

The silica aerogel which is fed into the ejector may be in essentially the same form as it is produced, but is preferably crushed or broken up into approximately nut-sized lumps or into smaller particles before it is fed into the ejector to facilitate uniform feeding and fluffing. It has been found that the reduction in density of such silica aerogel is an inverse function of the rate of feed, if the ejector size and air pressure are constant, that is, the reduction in density decreases as the rate of feed is increased. Conversely, the reduction in density increases with increased air velocity or air pressure, if the size of the ejector and rate of feed are constant.

Silica and other inorganic aerogels can be prepared in various ways. Silica aerogels are suitably prepared, for example, by first mixing an aqueous sodium silicate solution with a mineral acid such as sulfuric acid to produce a silica aquagel. The silica gel is then washed with water to remove water soluble reactants and salts. Such gel contains water as a liquid phase, and this water is preferably at least partially or completely removed from the gel before the gel is converted to an aerogel, and is replaced by a water-miscible liquid having a lower critical temperature. This is accomplished, for example, by washing the silica aquagel with ethanol, isopropanol, acetone and the like until a substantial quantity of the water in the aquagel has been displaced by the water-miscible liquid. The silica gel is then slowly heated in an autoclave or other pressure resistant vessel, small quantities of vapor being released as required to avoid excessive pressures, until the temperature of the gel is slightly above the critical temperature of the liquid in the gel. At this point the liquid has become converted to the vapor state and is slowly released as a vapor so as to avoid destruction of the gel structure. The aerogel obtained in this manner has substantially the same volume as the initial silica gel and consists essentially of a cellular structure having a large amount of void space.

A more detailed description of the above procedure for preparing aerogels will be found in the patents to Samuel S. Kistler, Nos. 2,093,454, 2,188,007, and 2,249,767. The density of the silica aerogel prepared in the above manner will depend to a considerable extent on the concentration of silica in the initial silica gel from which the aerogel is prepared.

Silica aerogels and other inorganic oxide aerogels may also be prepared by heating silica or other inorganic oxide organo-aquasols in place of silica or inorganic oxide gels in an autoclave above the critical temperature of the liquid phase in essentially the same manner. Such silica organo-aquasols are prepared, for example, by first admixing an aqueous sodium silicate solution with a mineral acid such as sulfuric acid at a pH of about 2 to 4 so as to prevent gelation, after which, a water-miscible liquid such as acetone, ethanol, isopropanol and the like is added to the mixture in order to precipitate the inorganic salts present therein. The precipitated inorganic salts or electrolytes are then removed from the resulting organo-aquasol by filtration, centrifuging and the like, and the sol is then ready for further processing in an autoclave for conversion to an aerogel as described above. A more detailed description of the procedure for preparing the above silica or inorganic oxide organo-aquasols will be found in the Morris D. Marshall patent, No. 2,285,449. By increasing the concentration of silica and decreasing the concentration of water-miscible liquid in the above sols, heavy silica aerogels having a relatively high apparent density can be produced.

Preparation of heavy silica aerogel

A silica aquagel was prepared by first admixing 1195 parts of sodium silicate comprising 19.2% $SiO_2$, 5.95% $Na_2O$ and 74.85% water (all percentages being by weight) with 1119.2 parts water and then adding the resulting mixture with stirring to a mixture consisting of 115.8 parts of 97% by weight $H_2SO_4$ and 439 parts of water. The resulting sol, which had a pH of about 4, soon turned to a gel having a concentration of about 8% by weight $SiO_2$. This gel was washed with water until it was substantially free of salts and electrolytes, after which, it was washed with ethanol until the liquid phase contained about 90% ethanol and 10% water. The gel was then placed in an autoclave and heated slowly, vapor being released as required to prevent excessive pressures in the autoclave, until the temperature of the contents of the autoclave was slightly above the critical temperature of the alcohol-water liquid phase in the gel. At this temperature all of the liquid phase was converted to a vapor which was slowly released from the autoclave so as not to disturb or injure the internal structure of the gel. After substantially all of the vapor had been released, the autoclave was opened and the silica aerogel was removed. The aerogel was then broken up into nut-sized lumps having an apparent density of about 7.3 pounds per cubic foot.

EXAMPLE

The heavy silica aerogel prepared as described above was fluffed in an air-jet ejector similar to that illustrated in the accompanying drawing. The ejector had a constricted throat approximately 1 inch in diameter and an exit opening of approximately 2½ inches, the rate of feed was about 100 pounds per hour and the air pressure on the nozzle was about 85 pounds per square inch gauge pressure. The aerogel was conveyed from the ejector by means of a 12-foot pipe and was collected in a bag filter. The apparent density of the fluffed aerogel was about 4.1 pounds per cubic foot, and the aerogel particles were in a substantially finely divided condition. The coefficient of thermal conductivity (or $k$) of the fluffed aerogel was about 0.195 at an average mean temperature of 100° F. ($k$=B. t. u. per hour per square foot per degree Fahrenheit through 1 inch of insulation), as compared to such materials as glass wool having a $k$ of about 0.24 and cork having a $k$ of about 0.28.

The following table illustrates the reduction in density obtained by fluffing other silica aerogels of varying density using the same apparatus as described above under various conditions of rate of feed and air pressure.

| Density of silica aerogel fed to air-jet ejector. (Pounds per cubic foot) | Operating Conditions | | Results | |
| --- | --- | --- | --- | --- |
| | Rate of feed of silica aerogel to air-jet ejector. (Pounds per hour) | Air pressure of air from nozzle 18. (Pounds per square inch gauge) | Density of silica aerogel collected from jet. (Pounds per cubic foot) | Percent increase in volume as result of fluffing |
| 9.2 | 116 | 80 | 3.6 | 206 |
| 9.2 | 146 | 78 | 3.9 | 154 |
| 8.3 | 109 | 81 | 3.4 | 215 |
| 8.0 | 164 | 78 | 3.9 | 156 |
| 6.0 | 96 | 87 | 2.6 | 127 |
| 5.5 | 106 | 80 | 2.8 | 103 |
| 5.0 | 112 | 90 | 2.0 | 176 |

Various modifications may be made in the foregoing method of fluffing aerogels and materials of a similar nature as will be apparent to those skilled in the art, and it is intended that the present invention be limited only by the scope of the appended claims.

What is claimed is:

1. A method of reducing the apparent density of a silica aerogel having an apparent density above about 5.5 pounds per cubic foot which consists in feeding said silica aerogel at the rate of 50 to 200 pounds per hour into an air-jet ejector having a constricted throat with a minimum diameter between about 1 and 6 inches, and simultaneously forcing said areogel together with air at atmospheric pressure through the constricted throat of said ejector by means of a high velocity air stream, said air stream being generated by passing compressed air at a gauge pressure of about 50 to 125 pounds per square inch through a nozzle in said ejector, said air stream being introduced at a point just prior to the constricted throat in said ejector, and separating the aerogel thus treated from the air stream and collecting the separated aerogel.

2. A method of reducing the apparent density of a material of the class consisting of aerogels, carbon blacks and diatomaceous earth which consists in feeding said material into a pipe having a constricted throat with a minimum diameter between about 1 and 6 inches and simultaneously forcing said material together with a gaseous substance at atmospheric pressure through the constricted throat of said pipe by means of a high velocity gaseous stream, said gaseous stream being generated by passing compressed air at a gauge pressure of about 50 to 125 pounds per square inch into said pipe, said gaseous stream being introduced at a point just prior to said constricted throat, separating the material thus treated from the gaseous stream and collecting the separated material.

3. A method of reducing the apparent density of a material of the class consisting of aerogels, carbon blacks and diatomaceous earth which consists in feeding said material at the rate of about 50 to 200 pounds per hour into a pipe having a constricted throat with a minimum diameter between about 1 and 6 inches and simultaneously forcing said material together with a gaseous substance at atmospheric pressure through the constricted throat of said pipe by means of a high velocity gaseous stream, said gaseous stream being generated by passing compressed gas at a gauge pressure of about 50 to 125 pounds per square inch into said pipe, said gaseous stream being introduced at a point just prior to said constricted throat, separating the material thus treated from the gaseous stream and collecting the separated material.

4. A method of reducing the apparent density of a material of the class consisting of aerogels, carbon blacks and diatomaceous earth which consists in feeding said material at the rate of about 50 to 200 pounds per hour into an air-jet ejector having a constricted throat with a minimum diameter between about 1 and 6 inches and simultaneously forcing said material together with air at atmospheric pressure through the constricted throat of said ejector by means of a high velocity air stream, said air stream being generated by passing compressed air at a gauge pressure of about 50 to 125 pounds per square inch through a nozzle in said ejector, said air stream being introduced at a point just prior to the constricted throat in said ejector, separating the material thus treated from the air stream and collecting the separated material.

5. A method of reducing the apparent density of a material of the class consisting of aerogels, carbon blacks and diatomaceous earth which consists in feeding said material at the rate of about 50 to 200 pounds per hour into an air-jet ejector having a constricted throat with a minimum diameter between about 1 and 6 inches and simultaneously forcing said material together with air at atmospheric pressure through the constricted throat of said ejector by means of a high velocity stream of superheated steam, said stream being generated by passing superheated steam at a gauge pressure of about 50 to 125 pounds per square inch through a nozzle in said ejector, said stream of superheated steam being introduced at a point just prior to said constricted throat, separating the material thus treated from said stream and collecting the separated material.

WALTER M. DAVIS.

References Cited in the file of this patent

UNITED STATES PATENTS

| Number | Name | Date |
|---|---|---|
| 275,566 | Bailey | Apr. 10, 1883 |
| 1,121,631 | Hupp | Dec. 22, 1914 |
| 1,325,676 | McKelvey | Dec. 23, 1919 |
| 1,791,100 | Lykken | Feb. 3, 1931 |
| 2,093,454 | Kistler | Sept. 21, 1937 |
| 2,151,083 | Christensen et al. | Mar. 21, 1939 |
| 2,200,713 | Erickson et al. | May 14, 1940 |
| 2,364,199 | Derr | Dec. 5, 1944 |
| 2,352,677 | Anderson et al. | July 4, 1944 |
| 2,421,902 | Neuschotz | June 10, 1947 |
| 2,433,193 | Bechtner | Dec. 23, 1947 |

FOREIGN PATENTS

| Number | Country | Date |
|---|---|---|
| 806,771 | France | Dec. 24, 1936 |